United States Patent [19]

Cadiou et al.

[11] 3,855,422

[45] Dec. 17, 1974

[54] TIME DIVISION MULTIPLEXER WITH EACH FRAME CONSISTING OF A FIXED LENGTH BIT ORIENTED ADDRESS FIELD AND A VARIABLE LENGTH CHARACTER ORIENTED DATA FIELD

[75] Inventors: Jean Jacques Cadiou, Vence; Georges Rene Guerinet, La Colles/Loup; Paul Raymond Callens; Andre Gustave Tracal, both of Cagnes/Mer, all of France

[73] Assignee: International Business Machines Corporation, Armonk, N.Y.

[22] Filed: July 5, 1973

[21] Appl. No.: 376,783

[30] Foreign Application Priority Data

July 10, 1972 France ............................ 72.25775

[52] U.S. Cl. ........................ 179/15 AL, 179/15 BA

[51] Int. Cl. ............................................. H04j 3/08

[58] Field of Search...340/172.5; 179/15 BA, 15 AL, 179/15 BY

[56] References Cited

UNITED STATES PATENTS

| | | | |
|---|---|---|---|
| 3,597,549 | 8/1971 | Farmer | 179/15 AL |
| 3,732,543 | 5/1973 | Rocher | 179/15 AL |
| 3,752,932 | 8/1973 | Frisone | 340/172.5 |

*Primary Examiner*—Ralph D. Blakeslee
*Attorney, Agent, or Firm*—Delbert C. Thomas

[57] ABSTRACT

A device for demultiplexing and multiplexing data characters to and from a plurality of terminals utilizing a recurrent framing format, the format, in inverse order, consisting of a variable length character field; an address field in which each bit position designates a different terminal, the bit value in the position defining the presence of and order in the character field sequence of a character destined for that terminal; and a synch character. Thus, only one bit is needed to character address a terminal in any given frame.

3 Claims, 7 Drawing Figures

MULTIPLEX DEVICE COUPLING A CENTRAL STATION AND REMOTE TERMINALS

FORMAT OF THE DATA FRAME

RING REGISTER

TRANSMISSION CONTROL UNIT

TIME DIVISION MULTIPLEXER WITH EACH FRAME CONSISTING OF A FIXED LENGTH BIT ORIENTED ADDRESS FIELD AND A VARIABLE LENGTH CHARACTER ORIENTED DATA FIELD

BACKGROUND OF THE INVENTION

This invention relates to a time-division multiplex process and a device for implementing the same. More particularly, the invention relates to a time-division multiplex process wherein the frames are of a variable time duration and the slots are not assigned to the terminals in a fixed manner.

As improvements are being performed in the data processing field, data transmission networks in this very field become more and more complex. It is currently used to collect the data coming from a plurality of terminals towards a central processing unit which stands often in a remote position with respect to each of the terminals. This, of course, cannot be accomplished by point-to-point connections between each terminal and the central system, which would necessitate great expense as to the transmission circuits which are, very often, telephone circuits. Consequently, intermediate system are employed which collect the data coming from a plurality of terminals having a slow transmission rate, and then, transmit them back to the central system over a single high rate transmission line. This is called data multiplexing. In the following description, the time-division multiplex process will be used.

In general, the term "multiplexer" means the device with which it is possible to only multiplex the data coming from a plurality of terminals, without having them processed. Such a device is called "transparent" i.e., it enables transparent concentration of the data channels, i.e., with no interpretation of the semantic contents of the data. Such a "multiplexer" is characterized in that, when the multiplex process is carried out between $n$ slow channels of rate $v$, over a rapid channel of rate V, relation $V=vn$ is obtained. Such a device has, generally, neither memory nor programming device and, therefore, there is not a high flexibility in the data transmission mode and in the type of the terminals which are connected thereto.

In contrast to "multiplexers," there exists a second class of devices termed "concentrators." Concentrators unlike the multiplex devices, analyze the message contents. Therefore, concentrators are not transparent. Thus, such concentrators require, besides an elaborate memory, a structure far more complex, calling generally, for a programming unit as an integral part to the machine. If $v$ is the transmission rate of $n$ multiplexed channels, and if V is the rate of the rapid channel, a concentrator is characterized in that $nv>V$.

The data multiplex techniques will now be considered, a technique of current use consists in multiplexing the data according to the messages. In that case, the central unit interrogates the multiplex device at regular intervals. The multiplex device which, in that case, is of the "concentrator" type, such as defined above, puts together the messages coming from the terminals. As soon as a message is assembled, the multiplex device answers the central unit by transmitting to it the complete message preceded by the address of the considered terminal. Such technique, therefore, requires a multiplex device or a concentrator having very large memory capacity. In addition, as said above, it requires a concentrator which is not transparent, which introduces a delay during transmission to or from the central unit.

Another data multiplex technique, which is called "character multiplexing" consists in grouping the data coming from the central unit into a frame of a fixed length divided into a plurality of slots the number of which is equal to the number of terminals. Each slot is allocated to a particular terminal and, thus, when the frame is received by the multiplex device, the latter transfers the characters which are in the slots to their respective terminals. Conversely, a frame is formed, before its being sent to the central unit, by transfer of the characters coming from the terminal into the slots which have been allocated to them. The simplicity of such a system stands in the fact that the addressing is not necessary since the same slot in a frame is always assigned to the same terminal. But, on the other hand, since the terminals have not always data to be transmitted or to be received, only one portion of the slots includes a character. Thus, in low traffic hours, the filling rate of the frame may decrease to 20 percent. Therefore, it can be seen that such a system entails a considerable time waste amounting to a poor economical throughput.

In order to overcome such a drawback, the frame multiplex technique is used, but with dynamic allocation of the slots. In such a system, a slot is no more allocated to a determined terminal, but can be allocated to any terminal which is not busy. Therefore, the number of slots in a frame is lower than the number of terminals. Indeed, with such a system, there still remains the drawback that, when few terminals have data to to received to be transmitted, all the slots are not allocated and a number of slots therefore, are blank. On the other hand, the terminal to which a slot is allocated must, first, send its address therein in order to inform that the slot in question is no more available, and it must transmit its address anew so as to indicate the end of the transmission and the availability of the slot. It can be observed, therefore, that even when the terminal has only one data character to be transmitted, the slot will have to be busied for three characters.

SUMMARY OF THE INVENTION

One object of this invention is to devise a time-division multiplex process with which it is possible to obtain an optimal utilization ratio of the transmission line-central unit. It is another object of this invention to provide for a time-division multiplex process which makes use of frames of variable length with no slots being assigned to the terminals in advance, which avoids transmitting frames having unused slots.

These objects, and others, are satisfied by an embodiment of a multiplex device, placed between a central unit and a plurality of terminals. It includes a common transmission line connected to the central unit, on the one hand, and multiplexing circuits ensuring the connection between said common line and the terminals, on the other hand. The data transmission over the common line is carried out by means of frames of variable lengths. Each of said frames is delimited by synchronization characters and consists of a fixed length bit oriented address field not longer than the synchronization character field and a variable length character oriented data field, the data characters each being sent to or from a terminal. Each address field contains as many bit positions as there are terminals seven being used as an illustration herein, with a single bit parity position, the bit ranks being in a one-to-one correspondence with the counterpart terminals. The binary value of each of these bits is indicative whether the counterpart has a frame data character which is assigned to it or whether it wishes to transmit to the central unit. More particularly, the device includes an arrangement for interconnecting the terminals in a fuel duplex serial loop for bidirectional (two-way) data communication using one direction of data transmission in the loop. Logic responsive to each received frame from the central station transfers over the loop each data character to the counterpart terminal designated by and in the sequence set forth by the positional bit values of the address field. Lastly, circuits responsive to terminal originated data characters format the bit oriented address field and time multiplex the characters from the counterpart terminals for transmission to the central station.

DESCRIPTION OF THE PREFERRED EMBODIMENT

Figure 1:
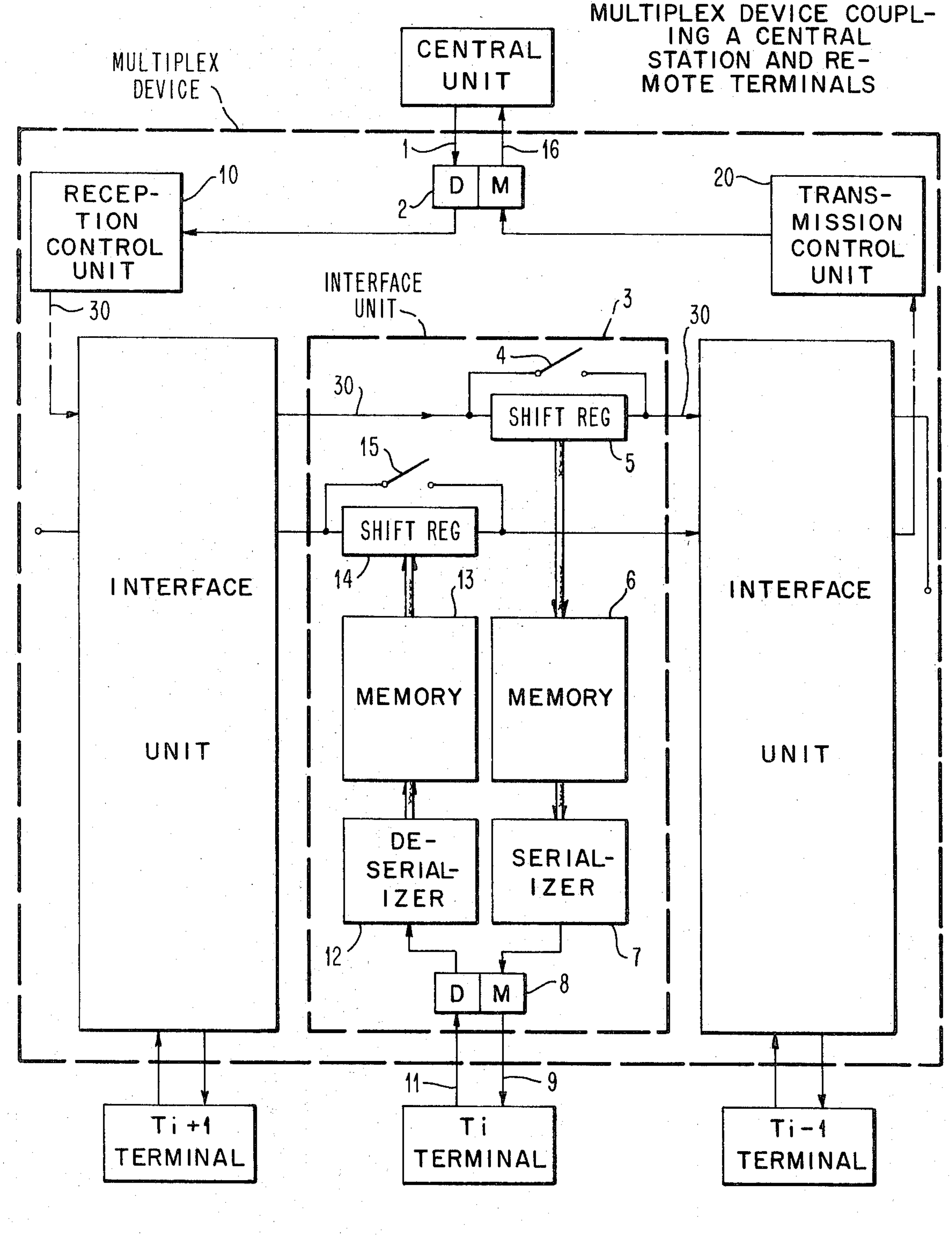
FIG. 1 is a block diagram of the multiplex device illustrating the duplex serial loop coupling of the terminals for bidirectional data communication thereon using one direction of data transmission in each half of the duplex loop.

Referring now to FIG. 1, there is shown a multiplex device positioned between a central unit and a plurality of terminals $T_1$ through $T_n$. In the preferred embodiment, the data is full-duplex transmitted (i.e., transmission from both the central unit and the terminals is possible simultaneously) over the transmission lines to the terminals or over the common line to the central unit. Such connections are easily achieved on the four-wire circuit which is at the user's disposal. But, of course, such a transmission can be carried out in half-duplex (i.e., both directions are possible, but in alternate). Thus, when considering the reception of the data coming from the central unit, such data is received at the multiplex device in series on line 1, demodulated by modulator-demodulator or modem 2, and then is applied to reception control unit 10 before being sent to the terminals of orders $T_n$ --- $T_i$ --- $T_1$.

Figure 2:
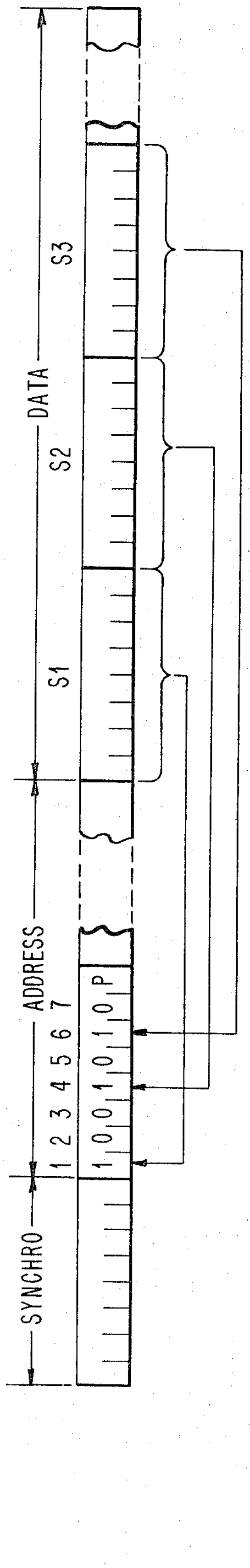
FIG. 2 diagrams the data frame as delimited by synch characters and consisting of a fixed length bit oriented address field and a variable length character oriented data field.

Referring now to FIG. 2, there is shown a frame such as the one which is received over line 1. Such a frame consists of a synchronization character, one of several address characters, and a variable number of data characters. When referring also to FIG. 1, the synchronization character is received first by reception control unit 10 which enables the latter to be synchronized at the beginning of each frame. The address character(s), then, are decoded by reception control unit 10. In FIG. 2, only one address character has been represented for the description, but it is evident that a higher number of address characters according to the number of the terminals could be used, for the number of the bit positions must be equal to the number of terminals, as it will be seen further on. Therefore, the address character includes 8 bits, from amongst which 7 bits are the significant bits, and 1 bit is the parity bit. Ranks 1, 2, 3, corresponding to the terminals No. 1, No. 2, ... No. 7 can be assigned to these 7 bits. In FIG. 2, it can be observed that the bit rank 1 is equal to 1. This means that the first data character following the address characters (character S1 in FIG. 2) is intended to be sent to terminal No. 1. The second bit of value 1 is the bit of rank 4, which means that the second data character, namely S2 in the figure, is intended to terminal No. 4. Likewise, the bit of rank 6 is equal to 1, which means that the third data character, namely S3, is intended to terminal No. 6. On the other hand, bits of ranks 2, 3, 5 and 7, respectively, are equal to 0, which means that no data character is intended to terminals No. 2, No. 3, No. 5, and No. 7.

As shown in FIG. 1, an interface unit 3 corresponds to each terminal $T_i$. The output line 30 of the data coming from reception control unit 10 goes in series through each of the interface units 3. In FIG. 1, the data go through these units in the decreasing order of terminals $T_n$ --- $T_i$ --- $T_i$.

For each interface unit 3, a shift register 5 is series-mounted on the data line, and a switch 4 is parallel-mounted on the register. All switches 4 are normally closed, thus short-circuiting all shift registers 5. When reception control unit 10 has decoded the data characters, it opens the switches of the interface units of the terminals which have a character to be received from the frame. Thus, when considering the example shown in FIG. 2, only the switches of the interface units of terminals No. 1, No. 4, and No. 6, are open. The three corresponding shift registers, then, are series-mounted on the line and everything occurs as if there was a large shift register with a capacity of three characters. The data which are sent in series from unit 10, then fill the non short-circuits shift registers, beginning with the interface unit register corresponding to the terminal having the highest identification number. As the following data are being received in said register, the bits are shifted in each of the non short-circuited shift registers, i.e., those which correspond to the terminals which are to receive a character.

When the first data bit has been shifted into the last position of the non short-circuited shift register corresponding to the terminal having the lowest identification number and which is to receive a character, the characters are in the appropriate registers and can be transmitted to the terminals. The character which is in register 5 of FIG. 1, thus, is parallel-transmitted to memory 6 which is of the "first in-first out" type (FIFO). This type of memory is formed of a number of memory positions so that when a character reaches the input, it is stored in the free memory position which is the nearest to the output. In this way, the characters leave the memory in the same order they entered it. At the output of memory 6, the character is serialized in serializer 7 and is series-transmitted to the terminal, through line 9, due to modulator-demodulator 8.

Thus, it can be seen that when reception control unit 10 has decoded the characters of the frame and has opened the switches of the terminals which have a character of the frame assigned to them, the register formed of the assembly of the registers having their switches open, is exactly the image of the succession of characters S1, S2 . . . of the data in the frame.

For the transmission of the data from the terminals to the central unit, the multiplexing operation is exactly the inverse of the demultiplexing operation which has just been described. The data reach the multiplex device through line 11, are demodulated by modem 8 and, then, are de-serialized in deserializer 12. Then, the data are stored in parallel by character in memory 13 of the FIFO type. As soon as a character is in the first position of memory 13 (i.e., waiting for being loaded into register 14), of at least one interface unit 3, the frame forming procedure is started. The characters are loaded into registers 14 and the corresponding normally close closed switches 15, are opened. The identification numbers of the corresponding terminals, then, are transmitted to transmission control unit 20. Thus, if only interface units of terminal No. 1, No. 4, and No. 6 have characters to be transmitted, the switches of these units are opened whereas all the other switches remain closed, thus short-circuiting the interface unit registers having nothing to be transmitted. In this example, the identification numbers 1, 4, and 6 are transmitted to transmission control unit 20. As it will be shown further on, the transmission control unit 20 constitutes the frame by forming the address characters from the identification numbers received from the interface units. The address characters then, are transmitted to line 16 through intermediary of modem 2, being preceded by a synchronization character formed by transmission control unit 20. When the last bit is transmitted, the data characters which are in shift registers 14 start being sent, upon shifting on the right. Thus, in the preceding example, the character corresponding to terminal No. 1 is directly transmitted after the last address character while the character corresponding to terminal No. 4 is loaded into the register of interface unit No. 1 and the character corresponding to the terminal No. 6 is loaded into the register of interface unit No. 4. Thus, by successive shift operations the character of terminal No. 4 is directly transmitted after the character of terminal No. 1 then, the character of terminal No. 6 is finally transmitted.

Figure 3A:
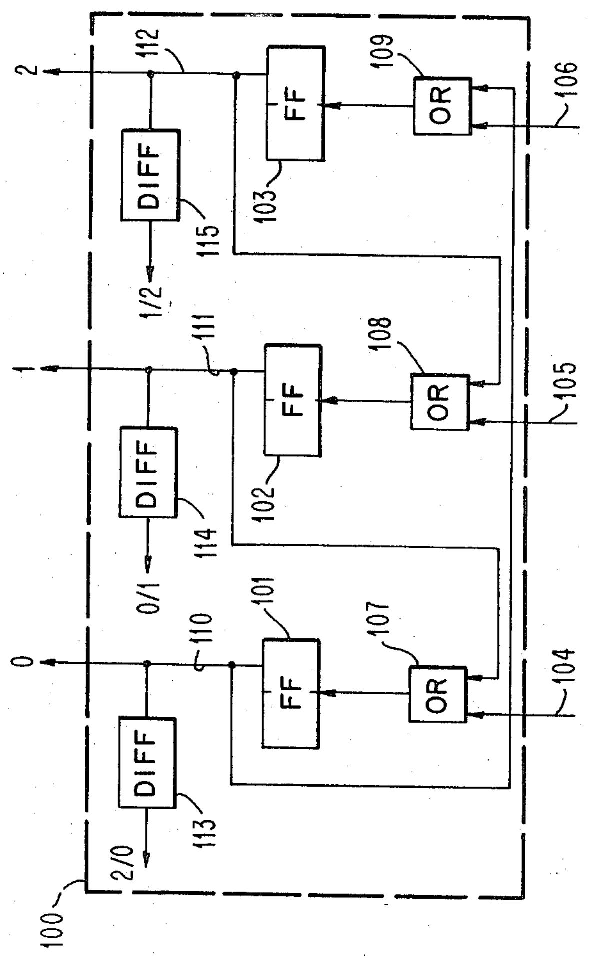
FIG. 3A is an embodiment of the ring register which is a part of the reception control unit of FIG. 3.
Figure 3:
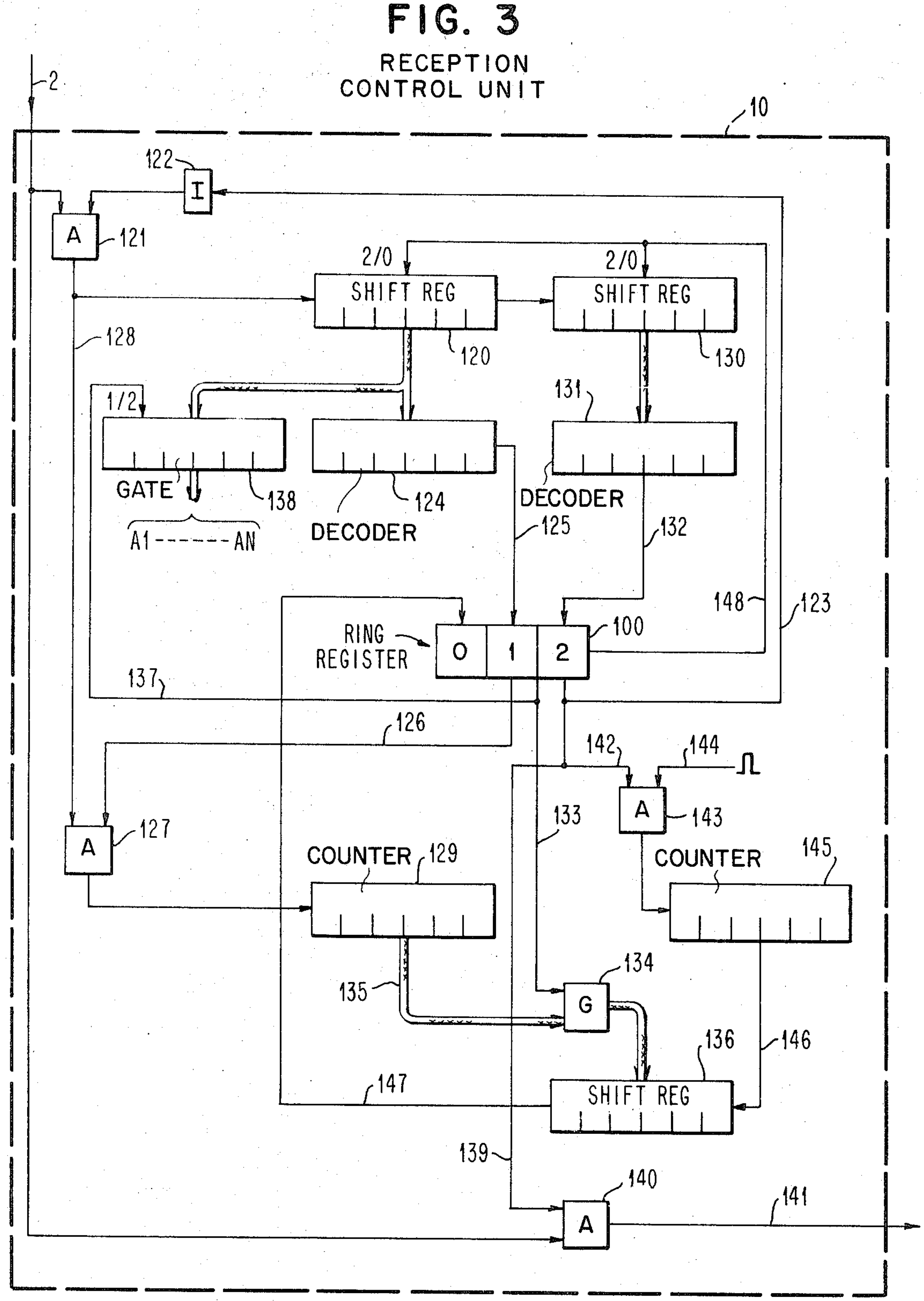
FIG. 3 is an embodiment of the reception control unit for distributing the data characters to the terminals over the loop as indicated by the frame address field.

Referring now to FIG. 3, there is shown a logic embodiment of the reception control unit 10. The frame is received on line 2 and the bits which are received in series are introduced into register 120, going through AND circuit 121 which is open due to values 1 it receives from inverter 122. Indeed, inverter 122 receives a bit 0 on its input line 123 from section 2 of register 100. Registers 100, which is the essential element in FIG. 3, is a kind of three-position ring register, which positions are designated by 0, 1, and 2. It includes 3 inputs, one on each of said positions.

An embodiment of such a ring register is shown in FIG. 3A. This FIG. 3 shows that it is comprised of three series-mounted single input triggers 101, 102, and 103. The outputs of each trigger are derived from the input of the preceding trigger. The three external inputs 104, 105 and 106 are introduced into triggers by OR circuits 107, 108, 109, the second input of these OR circuits being formed of the input of the following trigger. With such an arrangement, only one trigger assumes state 1, the other two ones assuming state 0. In order to move state 1 from one register position to the next one, it suffices to send a 1 to the input of the latter. Thus, when assuming that position 0 of register (namely trigger 101) assumes state 1, if a 1 is sent to the input 105 of position 1, or trigger 102, the latter changes its state and passes from state 0 to state 1. Since the output of trigger 102 is derived at the input of trigger 101, the latter receives, on its input, a pulse from 0 to 1 (positive), which causes it to change its state, i.e., it passes from 1 to 0. On the contrary, trigger 103 receives from trigger 101 a pulse from 1 to 0 (negative), which causes it not to change its state, and consequently, it remains in state 0. Therefore, everything happened as if the pulse sent to the input of position 1 caused the 1 to pass from position 0 to position 1. As shown in FIG. 3A, outputs 110, 111 and 112 of triggers are marked by 0, 1 or 2 in order to indicate the state of the corresponding register position. Since, the instants indicating the change in the states of the register are required, outputs 110, 111 and 112 are applied to differentiating circuits 113, 114 and 115, respectively. Thus, the output of differentiator 113 supplies a brief pulse when register 100 passes from state 2 (state 0 of trigger 101, state 0 of trigger 102, state 1 of trigger 103) to state 0 (state 1 of trigger 101, state 0 of trigger 102, state 0 of trigger 103), and for description purposes, it will be called pulses 2/0. Likewise, the output of differentiator 114 is called 0/1 and the output of differentiator 115 is called ½.

Referring again to FIG. 3, there is shown a ring register 100. This register assumes state 0 when there is no transmission. This causes a 0 to be received at inverter 122, through line 123. As said previously, when the frame occurs, the bits are series-loaded into shift register 120. The shift register is conditioned by AND 121 which in turn is opened by bit 1 which is received from inverter 122. The frame is acknowledged by the lead synchronization character. Indeed, all the characters received on line 1 are parallel-decoded by decoder 124. When the received character is the synchronization character, decoder 124 acknowledges it and produces a positive pulse on line 125. This causes ring register 100 to pass from state 0 to state 1. Upon ring register assuming state 1, a bit 1 is sent over line 126 in order to open AND circuit 127. Therefore, the bits which immediately follow the synchronization character, which are the bits of the address characters, reach through line 128 and AND circuit 127, register 129 which had previously been put back to zero and which starts counting the significant bits of these address characters.

Only one address field follows the synchronization character. Such an address field is also series-loaded into shift register 120 while the synchronization character is shifted into register 130. As soon as the synchronization character is completely loaded into register 130; it is parallel-decoded by decoder 131. When decoder 131 acknowledged that the synchronization character is loaded into register 130, it sends a pulse, through line 132 to input 2 of ring register 100, which thereupon, passes from state 1 to state 2.

After the synchronization character has been completely loaded into register 130, the address character is likewise completely loaded into register 120. Therefore, all the 1 bits of the address field have been counted into register 120. This register also contains a value representative of the number of terminals which are to receive a data character. The change from state 1 to state 2 of ring register 100 produced a state changing pulse ½. Such a pulse opens a gate 134 through line 133, which enables the contents of register 129 to be loaded in parallel into count-down shift register 136. Pulse ½ is also sent, through line 137, to gate 138. Since this gate is open, this enables the contents of register 120 to be parallel-transferred to the interface units. Since this contents is the address characters, values A . . . An of the bits of said character are equal to 1 or 0 according as the corresponding terminal is to receive a data character, as seen previously with reference to FIG. 2, and bits Al through An are supplied to the corresponding interface units for the control of the switches of said units. Only the bits of value 1 control the opening of the corresponding switches whereas bit 0 have no action and, therefore, the registers of the interface units corresponding to these bits of value 0, remain short-circuited.

In order to simplify the description here, it has been supposed that the one-to-one correspondence between the ranks of the address character bits and the identification numbers, was merely equality, i.e., the bit of rank 1 corresponds to terminal No. 1, bit of rank 2, to terminal No. 2, etc. But, as seen previously, any other one-to-one correspondence can be used. In that case, a correspondence decoder should be provided between register 120 and gate 138.

Register 100 is now in state 2 and a 1 bit is supplied over line 123 for blocking of AND circuit 121 due to inverter 122. A 1 bit is also applied over line 139 for the opening of AND circuit 140. Thus, the bits which follow the address character, i.e., the data bits, instead of being loaded into register 120, are now sent to the interface units through line 141.

Another output of position 2 in ring register 100 is sent through line 142 to AND circuit 143. As soon as register 100 has passed from state 1 to state 2, gate 143 is opened, which causes the clock pulses (not shown) supplied at the bit frequency of data line 1, to feed counter 145. Said counter is pre-established to the length of a data character, here shown as having a value of 8. Thus, every 8 pulses, it supplies a pulse to countdown counter 136, through line 146. Every 8 clock pulses, i.e., during the period when a character is received, counter 136 counts down one unit. When it reaches 0, the last data character of the frame has been received on line 1 since its contents was equal to the number of data characters which the frame is formed of. Value 0 of counter 136, then starts sending a pulse through line 147 to input 0 of ring register 100. A state changing pulse 2/0 for ring register 100, supplied over line 148 restored shift registers 120 and 130 which assume position 0. The reception control unit, therefore, is ready to receive the next following frame.

Figures 4, 6:
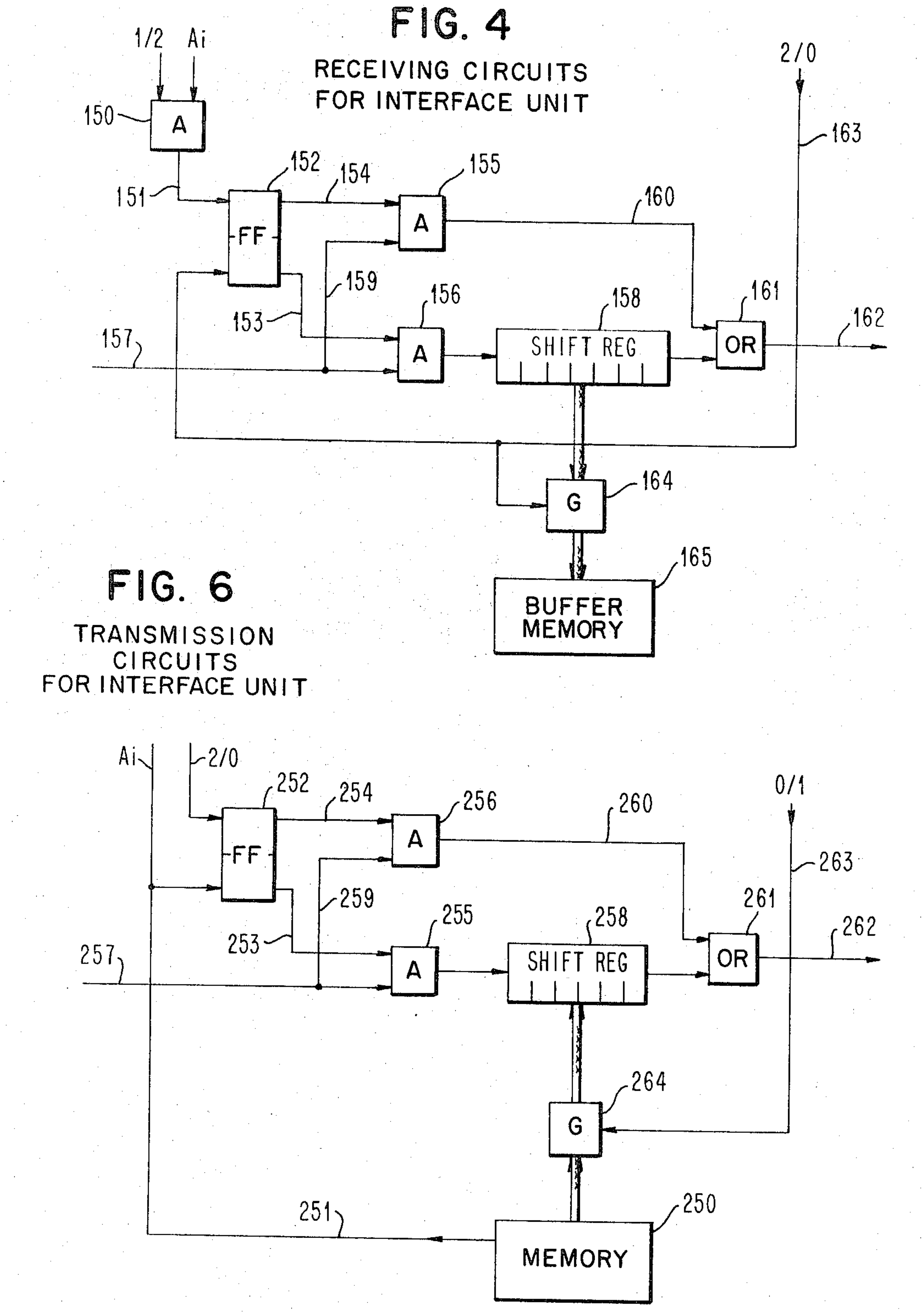
FIG. 4 is an embodiment of the data reception circuits for buffering and serializing/deserializing for terminal processing purposes.
FIG. 6 is an embodiment of the data transmission circuits which shows the manner the data is time multiplexed by the interface units of the multiplex device according to the invention.

The character reception circuits of the interface unit will now be described with reference to FIG. 4. As seen previously, the address characters are decoded during state 1 of ring register 100 (see FIG. 3). After this decoding operation, bits Al, . . . Ai, . . . An (which are merely the address character bits when the one-to-one correspondence is simply equality) are sent to the interface units. When considering bit Ai of value 1, this bit is used to make AND circuit 150 conducting which then passes state changing pulse ½ for the ring register. Such a pulse is sent, through line 151, to the two-input trigger 152. The latter then changes its state and a 1 appears at its output 153 whereas a 0 is established on its output 154. In that case, AND circuit 155, one input of which is line 154, is blocked and AND circuit 156, one input of which is line 153, is made conducting, which will force the bits coming from line 157, to pass through shift register 158. Of course, if bit Ai has 0 for a value, AND circuit 150 remains non-conducting and trigger 152 has not its state changed. In that case, its state corresponding to a 1 on its output 154, is a 0 on its output 153. The bits, which come through line 157, short-circuit register 158 by the second input 159 of AND circuit 161, and are sent to the next interface unit through line 162. On the other hand, when reconsidering the hypothesis made at the beginning where Ai is equal to 1, the data bits transmit through shift register 158 until the first data character is completely loaded into shift register of the first interface unit that is to receive data. At this moment, shift register 158 contains the data character intended to the corresponding terminal. A state changing pulse 2/0, which comes through line 163, opens gate 164, which causes the data character which in register 158 to be parallel-transferred into the buffer memory 165. Line 163 is also the second input of trigger 152 and when pulse 2/0 is applied, trigger 152 has its state changed, supplying a 1 on its output 156 and a 0 on its output 153. Of course, if Ai assumes value 0 and if the trigger remains in its previous condition, pulse 2/0 has no action. Thus, whether the interface unit receives a pulse or not, the shift register is still short-circuited when ring register 100 has resumed its state 0.

Figure 5:
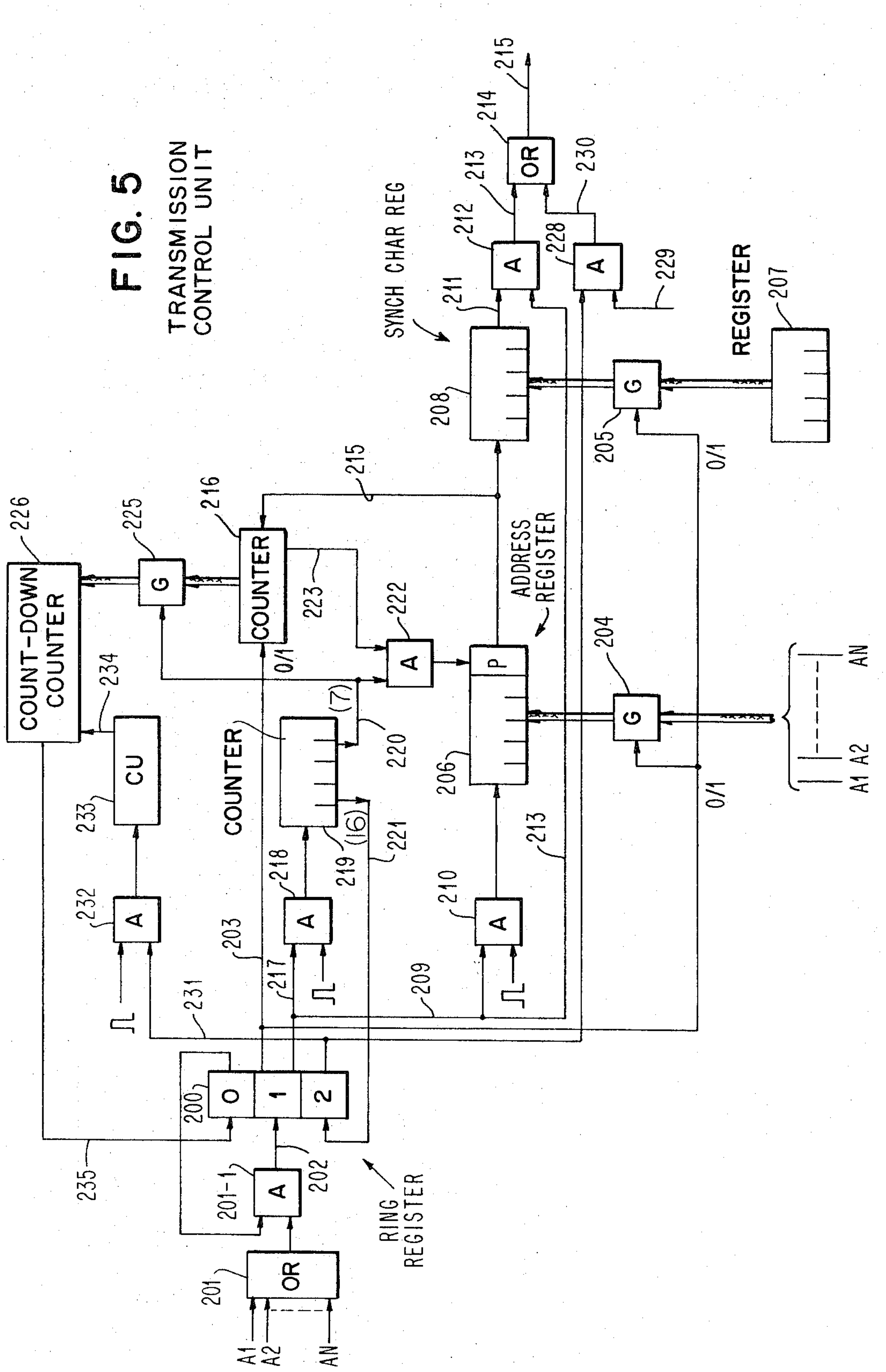
FIG. 5 is an embodiment of the transmission control unit responsive to terminal originated data characters for formatting an address field and time multiplexing the characters from counterpart terminals for transmission to the central station.

FIG. 5 is an embodiment of a transmission control unit according to this invention. When no data are received from the terminals, ring register 200 assumes state 0. Ring register 200 is identical with ring register 100 of reception control unit of FIG. 3. Therefore, it is not deemed necessary to describe further, an embodiment thereof having been disclosed with reference to FIG. 3A. In FIG. 5, as soon as a data character is pending (waiting condition) in one of the interface units, one of the inputs, if not a plurality of them, A1, A2 . . . An of OR circuit 201 is then set to 1. Since ring register 200 assumes state 0, a bit 1 is received at the input of AND circuit 201-1 which then becomes conducting. So a bit 1 coming from OR circuit 201 is applied through line 202 to input 1 of register 200, which causes it to pass from state 0 to state 1. A positive pulse 0/1, then is sent through line 203 to gates 204 and 205. Gate 204, which is then conducting, causes bits A1, A2, . . . An to be transferred in parallel into address register 206. Bits A1, A2, . . . An are supplied by the interface units, as it will be seen further on. Bits Ai assume value 1 if only the corresponding interface unit has a data character which is ready to be transmitted. As seen previously, the correspondence between rank

*i* of the bit in the address character and the number of the terminal to which the designated character in the frame corresponds, can be any one-to-one correspondence which is chosen, here, for simplicity purposes, as being simply equality.

Likewise, pulse 0/1 entails the opening of gate 205 which enables the synchronization character to be transferred in parallel from register 207 to synchronization register 208. As ring register 200 assumes state 1, a bit 1 is supplied through line 209 to AND circuit 210 which enables the clock pulses (not shown) which have for a frequency the bit sending frequency over the common line, to cause the bits of register 206 to be shifted. Thus, as soon as ring register 200 assumes state 1, the address character bits of register 206 are loaded, bit by bit, into register 208. The synchronization character bits which are in register 208, are transmitted to AND circuit 212, through line 211. AND circuit 212 which receives a 1 from ring register 200, through line 213, passes first, the synchronization character bits and then the character bits, and finally the address bits, to common line 215, through line 213 and OR circuit 214.

At the output of register 206, the bits are sent through line 215 to counter 216. The latter, which as returned to zero through intermediary of pulse 0/2 used to change the state of ring register 200 is then incremented each time it receives a bit 1 from register 206. Therefore, counter 216 counts the number of significant bits of the address character formed in register 206, i.e., the number of data characters which the frame to be sent will be comprised of. Likewise, as soon as ring register 200 has assumed state 1, a 1 bit is supplied, through its input 217, to AND circuit 218. AND circuit 218 then passes through its second input, the clock pulses to counter 219 at the bit sending frequency. Counter 219 is a pre-set two-position counter, i.e., it supplies a first pulse over line 220 when it has counted 7 pulses and it supplies a second pulse over line 221 when it has counted 16 pulses. Line 220 is the input of an AND circuit 222 which, then, becomes conducting when 7 bit times have elapsed since the moment when ring registers 200 passed from state 0 to state 1. At this instant, the 7 address character bits have already been shifted from register 206 to register 208. Likewise, at this instant, counter 216 has accumulated the number of significant bits of the address character (here, bits of value 1) and its rightmost bit (having the lowest weight) is indicative of the parity of the address character. This parity bit then, is transferred through the second input 223 of AND circuit 222, into the last position of register 206, in order to be transmitted just after the 7 address character bits.

When a pulse is sent by counter 219 after it has counted 7 pulses, said pulse is also sent through line 224, to gate 225. This gate is then opened and it enables the bits contained in counter 216 to be transferred in parallel to count-down counter 226. At this moment, counter 226 then contains the number of data characters which must be found in the frame to be transmitted.

As seen previously, counter 219 produces a pulse over line 221, when it reaches value 16. Since counter 219 has started counting when ring register 200 passed to state 1, i.e., at the beginning of the transmission of the bits of the synchronization character from register 208, through line 211, AND circuit 212, OR circuit 214 and line 215, its contents reaches 16 when two characters have been transmitted, i.e., when the last bit of the address character has been transmitted. Therefore, the pulse produced by counter 219 is sent to the input 2 of ring register 200, through line 221. Ring register 200, then passes from state 1 to state 2. As soon as ring register 200 assumes state 2, a 1 bit is sent to AND circuit 228, through line 227. AND circuit 228, then becomes conducting and enables the bits of data characters arriving through line 229, to be transmitted through line 230, OR circuit 214 and line 215 after the address character.

Upon ring register 200 assuming state 2, then a 1 bit is supplied through line 231, to AND circuit 232. AND circuit 232 than passes the clock pulses arriving at the bit sending frequency over the common line to counter 233. Counter 233 is preset to 8, i.e., it supplies a pulse each time it has counted 8 clock pulses. Therefore, every 8 clock pulses, i.e., the time during which a data character is transmitted over line 215, counter 233 sends a pulse to count-down counter 226, through line 234. Count-down counter 226 which as seen previously, contained a number equal to the number of data characters which the frame is comprised of, it therefore decreased by 1 each time a data character is transmitted. The contents of count-down 226, therefore, is equal in a constant manner to the number of data characters remaining to be transmitted. As soon as it reaches 0, count-down counter 226 sends a pulse through line 235 to input 0 of ring register 200 which then passes from state 2 to state 0.

As long as state 0 is lasting, no frame is transmitted to the central unit. It is only when at least one character is waiting in the interface units that the ring register assumes state 1 due to a 1 bit supplied by OR circuit 201, AND circuit 201-1, made conducting by state 0 of register 200, and line 202. In that case, as it has just been seen, a new frame is formed which can be transmitted. Therefore, it can be observed that it is possible that data characters are continuously pending in the memory of the interface units and that, in that case, state 0 lasting a very short instant, the frames are transmitted, being separated only by a negligible time interval. But it is also possible that state 0 lasts a sufficiently long time and that two frames are separated by a relatively long time interval. Of course, such a case must not occur and the arrangement will be such that the number of terminals be sufficient so that there is a minimum dead time.

A description of the transmission circuits at the interface unit level will be given with reference to FIG. 6. As shown in this figure, as soon as a data character arrives at the last position of memory FI-FO 250, a bit 1 is sent, through line 251, to the first input of two-input trigger 252. This trigger changes its state and a bit 1 is supplied on its output 253 and a bit 0 is on its output 254, whereas before, bit 1 was on output 254 and bit 0 was on output 253. Therefore, AND circuit 255 is made conducting and AND circuit 256 is blocked. Thus, data bits which will come from the preceding interface units, through line 257, will be loaded into shift register 258 and will be no more short-circuited through the second input 259 of AND circuit 256, line 260, OR circuit 261, and output line 262.

As seen previously, as soon as a data character in memory 250 is ready to be transmitted, a bit Ai of value 1 is transmitted to the transmission control unit and is used to form the address character. At the same time, bit Ai is supplied by line 251 as an input to trigger 252. As seen before with reference to FIG. 5, bit Ai starts the formation of the frame by the transmission control unit by causing ring register 200 to change its state from 0 to 1 when the latter was before in state 0. A state changing pulse 0/1, then is supplied by line 263 to gate 264. Gate 264, which is made conducting, then causes the first character to be transferred in parallel from memory 250 to register 258. Then nothing happens as long as ring register 200 assumes state 1. As soon as it assumes state 2, the shift pulses are supplied to the input of the first interface unit. The data characters then are shifted from one register to the next one but only in those of the interface units which have data to be transmitted, for the registers of the units which have nothing to be transmitted are short-circuited. Therefore, at that moment, a data character reaches register 258, through line 257 and AND circuit 255 whereas the character standing therein is transmitted to the next non short-circuit register, through OR circuit 261 and line 262. When ring register 200 passes from state 2 to state 0, a state changing pulse 2/0 causes trigger 252 to be set supplying a 1 on its output 254 and a 0 on its output 253. Thus, the circuits are pending, i.e., shift register 258 is short circuited, and a new frame forming operation can therefore be started.

In the embodiment of the invention which has just been described here, it has been seen that a FIFO buffer memory was used for both data reception and data transmission. The capacity of such a memory will depend on the transmission rates so utilized as well as on the number of the terminals. But, as a rule, the optimum capacity must be such that the saturation risk of a memory by the corresponding terminal during high traffic hours, must be very small, allowing for the cost imposed by a large capacity memory. By way of an example of the capacity of the utilized memory, a multiplex device according to this invention and operating between a common line transmitting the data at a rate of 1,200 bauds and 14 terminals transmitting at a rate of 135.5 bauds, requires buffer memories having a capacity of 3 characters.

It is clear that the preceding description has only been given as an unrestrictive example and that numerous alternatives may be considered without departing from the spirit and scope of this invention.

What is claimed is:

1. A multiplexing device for controlling the transmission of data characters between a central station and selectively chosen ones of a plurality of terminal stations wherein:

the data characters are multiplexed into frames containing not more than one character for each terminal station with each frame consisting of a frame identifying character, an address character identifying the terminal stations for which frame data characters are present in the frame and a variable number of data characters, said device including;

a receiving and a transmitting shift register for each terminal, means connecting each shift register to its associated terminal for data transfer, circuits for connecting all of said receiving shift registers into a serial train of shift registers, other circuits for connecting said transmitting shift registers into a second serial train of shift registers, a normally closed switch for each shift register to bypass said circuits around the associated register, a reception control unit to store the data in said address field as received from a central station, means in said reception control unit to open selected ones of said switches for said receiving shift registers in accordance with the data in a received address field, means in said reception control unit for thereafter passing received signals representing said variable length data field to said receiving shift registers having opened switches, means at each terminal to store signals representing a data character to be transmitted into its associated transmitting shift register and to open the corresponding switch for said shift register, and a transmission control unit activated by storage of a data character in one or more of said transmission shift registers to control transmission to said central unit of a frame of data including the characters stored in said transmitting shift registers having opened switches.

2. A mutliplexing device as set out in claim 1, and including therewith, a data storage device for each receiving shift register, a gate to pass data stored in said shift register to said storage device, and gate control means activated by said reception control unit after reception of the last character signal of said variable number of data characters of the data frame being received.

3. A multiplexing device as set out in claim 1, and including therewith a transmit data storage device for each transmitting shift register, a transmission data gate circuit to pass data stored in said transmit data storage device to said transmit shift register, and a transmission data gate control circuit to energize said gate to pass data into said transmit shift register when data is stored in at least one of said transmit data storage devices and a previous data transmission has been terminated.

* * * * *